(12) United States Patent
Irwin et al.

(10) Patent No.: US 7,189,423 B2
(45) Date of Patent: Mar. 13, 2007

(54) PH CONTROL OF SAUCES USED ON ACIDIFIED PASTA OR RICE

(75) Inventors: Anthony Irwin, Columbus, OH (US); Sharon Payton, Mt. Gilead, OH (US)

(73) Assignee: Kraft Foods Holdings, Inc., Northfield, IL (US)

( * ) Notice: Subject to any disclaimer, the term of this patent is extended or adjusted under 35 U.S.C. 154(b) by 334 days.

(21) Appl. No.: 09/842,195

(22) Filed: Apr. 26, 2001

(65) Prior Publication Data

US 2002/0054939 A1    May 9, 2002

Related U.S. Application Data

(60) Provisional application No. 60/199,830, filed on Apr. 26, 2000.

(51) Int. Cl.
*A23L 1/39* (2006.01)
*A23L 1/48* (2006.01)

(52) U.S. Cl. .................. 426/120; 426/557; 426/589

(58) Field of Classification Search ............. 426/120, 426/324, 326, 557, 589
See application file for complete search history.

(56) References Cited

U.S. PATENT DOCUMENTS

| | | | | |
|---|---|---|---|---|
| 4,568,555 A | * | 2/1986 | Spanier ............... | 426/582 |
| 4,597,974 A | * | 7/1986 | Fonteneau et al. ........ | 426/129 |
| 4,597,976 A | * | 7/1986 | Doster et al. ........... | 426/325 |
| 4,704,294 A | * | 11/1987 | Rakosky ............... | 426/578 |
| 4,734,291 A | * | 3/1988 | Raffensperger .......... | 426/325 |
| 4,828,852 A | * | 5/1989 | Hsu et al. .............. | 426/94 |
| 5,137,737 A | * | 8/1992 | Kaiser et al. ........... | 426/94 |
| 5,308,632 A | * | 5/1994 | Howard et al. .......... | 426/460 |
| 5,312,639 A | * | 5/1994 | Howard et al. .......... | 426/575 |
| 5,320,860 A | * | 6/1994 | Duval et al. ............ | 426/582 |
| 5,332,587 A | * | 7/1994 | Howard et al. .......... | 426/128 |
| 5,368,877 A | * | 11/1994 | Huang et al. ........... | 426/589 |
| 5,529,794 A | * | 6/1996 | Fultz .................... | 426/115 |
| 5,562,938 A | * | 10/1996 | Lee et al. .............. | 426/106 |
| 5,599,573 A | * | 2/1997 | Barnes et al. ........... | 426/451 |
| 5,695,798 A | * | 12/1997 | Rozzano ................ | 426/115 |
| 5,759,607 A | * | 6/1998 | Chawan et al. .......... | 426/557 |
| 5,817,356 A | * | 10/1998 | Gum et al. ............. | 426/325 |
| 5,922,381 A | * | 7/1999 | Bajracharya et al. ...... | 426/321 |
| 5,942,270 A | * | 8/1999 | Oganesoff et al. ........ | 426/262 |
| 5,958,488 A | * | 9/1999 | Baker et al. ............ | 426/289 |
| 5,972,408 A | * | 10/1999 | Hardman et al. ........ | 426/589 |
| 6,001,405 A | * | 12/1999 | Bajracharya et al. ...... | 426/325 |
| 6,017,573 A | * | 1/2000 | Baker et al. ............ | 426/557 |
| 6,056,984 A | * | 5/2000 | Ekanayake et al. ....... | 426/120 |
| 6,322,829 B1 | * | 11/2001 | McGlynn et al. ......... | 426/89 |
| 6,395,320 B1 | * | 5/2002 | Hazell et al. ........... | 426/392 |
| 6,428,835 B1 | * | 8/2002 | Debbouz et al. ......... | 426/557 |
| 6,548,100 B1 | * | 4/2003 | Bauer et al. ............ | 426/589 |

FOREIGN PATENT DOCUMENTS

EP    0239656    *  7/1987
GB    2188530    * 10/1987

* cited by examiner

*Primary Examiner*—Carolyn Paden
(74) *Attorney, Agent, or Firm*—Stevens, Davis, Miller & Mosher, LLP

(57) ABSTRACT

A pasta or rice meal in which the pasta has been acidified to ensure shelf stability. In order to provide the meal so as not to have the uncharacteristically unpleasant taste of acidic flavor notes by mixing a sauce which has had its pH modified by a mixture of an edible alkaline or base substance into the sauce. Methods of providing the meal including packaging of the pasta/rice separately from the sauce are also disclosed.

4 Claims, No Drawings

PH CONTROL OF SAUCES USED ON ACIDIFIED PASTA OR RICE

CROSS REFERENCE TO RELATED APPLICATION

The present application is a non-provisional application, which claims the benefit of provisional application Ser. No. 60/199,830, filed Apr. 26, 2000.

BACKGROUND OF THE INVENTION

1. Field of the Invention

The present invention relates generally to sauces and, specifically, to sauces which are used on, or in combination with, pasta or rice that has been acidified to a pH of 3.7 to 4.5 for preservation purposes.

2. Description of the Related Art

In U.S. Pat. No. 5,759,607 is described a process for acidifying pasta or rice in order to extend the shelf life of such pasta or rice. However, when the pasta or rice is typically acidified to a pH of 3.7 to 4.5 for preservation purposes, such pasta or rice provides an objectionable, uncharacteristic flavor, especially when used in combination with sauces that typically have no acidic flavor. In U.S. Pat. No. 4,568,555, is described a process of making a typical cheese sauce. When mixing a typical cheese sauce with acidified pasta/rice, the acidic notes of the pasta/rice results in an uncharacteristic taste to the meal. The disclosure of the foregoing patents is herein incorporated in its entirety by reference.

OBJECTS AND SUMMARY OF THE INVENTION

It is an object of the invention to provide a shelf stable pasta or rice product having a pH on the order of about 3.7 to about 4.5 for preservation purposes, which has no objectionable, uncharacteristic flavor when used in combination with sauces that typically have no acidic flavor.

It is a further object of the invention to provide sauces for pasta and rice having a pH higher than the acidified pasta and rice to which they are mixed or used in combination to provide a typical, pleasant flavor profile that was more preferred by tasters.

It is a further object of the invention to provide a two part packaged product in which the first part comprises an acidified pasta or rice product and the second part comprises a sauce which has a higher pH than the pasta or rice. The invention also concerns a method for producing ready to eat pasta or rice products, which are obtained by mixing a sauce and a pasta or rice (with or without heating) to produce a more typical, pleasant flavor profile that is more preferred by tasters. Acidic flavor notes that could be detected by mixing an acidified pasta or rice with a regular sauce are muted or were not present in a pH adjusted sauce. These and other objects of the invention will be apparent from reading the following description of the preferred embodiments.

DETAILED DESCRIPTION OF THE PREFERRED EMBODIMENTS

In U.S. Pat. No. 5,759,607, acidified pasta or rice was prepared so as to provide storage stability for the cooked product. Typically, the pasta or rice is acidified to a pH of about 3.7 to about 4.5 for preservation purposes. However, such pasta or rice provides an objectionable, uncharacteristic flavor when used in combination with sauces that typically have no acidic flavor. Thus, a more desirable overall flavor of the pasta or rice dish can be achieved when the normal pH of a typical sauce is raised to a higher level by the addition of a substance, such as an edible alkaline or base substance.

This was demonstrated with the combination of a cheese sauce and acidified pasta, wherein the cheese sauce having a normal pH of about 5.3 to about 6.0, preferably about 5.5 to about 5.9 was raised to a pH between about 6.2 to about 7.2. Even though the acidified pasta to which the modified cheese sauce was added had a normal pH in the range of about 3.7 to about 4.5, the combined pasta and sauce had a more typical pleasant flavor profile that was more preferred by tasters. Acidic flavor notes that were detected with the regular sauce on the pasta were not present when the pH adjusted sauce was mixed with the pasta. We have found that the results of the invention can be achieved if the pH of the sauce is raised to an uncharacteristically higher level by at least a fraction of a pH unit. We have found suitable results by raising a sauce having a pH of 5.5 to 5.9. The following examples are illustrative of the invention but are not to be construed as limiting the invention:

EXAMPLE 1

Cheese sauce ingredients are blended and the pH is taken. The natural pH of 5.9 is raised to as high as 7.2 pH using 1 M disodium phosphate solution, 50 ml of 1 M disodium phosphate duohydrate and 13.9 ml of 0.1 M NaOH, and 2 N NaOH. The sauce is otherwise processed according to the methodology normal for that particular sauce. The sauce, thus processed, is hermetically packaged to provide a shelf-stable product. This sauce is ultimately mixed with an acidified pasta dish having a pH in the range of about 3.7 to about 4.5.

EXAMPLE 2

White sauce that is successfully marketed for use with freshly cooked conventional pasta normally has a pH of 5.4 to 5.6. Pasta used is typically dry pasta that has been cooked in boiling water for 10 minutes or until a desirable texture is achieved. The resulting pasta is close to a pH of 6.8 to 7.0. Freshly extruded pasta or pasta that has been not fully dried can also be used. When fully cooked and hydrated these pastas will also have a pH close to 6.8 to 7.0. When used with commercial sauces the combination has a pleasant flavor that can be characterized as Alfredo, Garlic Alfredo or a flavored variety. Examples of such sauces are Classico Alfredo Sauce, Five Brothers Alfredo Sauce or Ragu Alfredo Sauce. All are made with a retorted sauce. Similar sauces could be made as refrigerated or frozen sauces. When these sauces are combined with an acidified pasta such as that made under U.S. Pat. No. 5,795,607, the combination of sauce and acidified pasta have an unpleasant acidic aftertaste, uncharacteristic of that made with conventional pasta. In this invention, a sauce is made with an uncharacteristically higher pH to provide a balanced flavor similar to that of the combination of conventional pasta and conventional sauce. The sauce is prepared by the following method:

| | |
|---|---|
| Fresh Cream | 15.0% (10.0–30.0%) |
| Soybean Oil | 5.0% (0.0–100%) |
| Cheese | 7.0% (2.0–20.0%) |
| Butter | 2.5% (0.0–5.0%) |

-continued

| | |
|---|---|
| Emulsifier | 3.0% (2.5–3.5%) |
| Disodium Phosphate | 0.75% (Quantity to adjust pH to desired level approximately 0.7%–1.0%) |
| Starch | 2.2% (Quantity to adjust viscosity to desired level approximately 2.0–2.5%) |
| Xanthan Gum | 0.1% |
| Flavors | 4.55% (sugar, cheese flavor, butter flavor, salt, garlic, pepper, spices and seasonings) |
| Water | 60.0% |

Water Phase
1. Add starch into water and mix 3 minutes
2. Add dry ingredient blend (sugar, salt, disodium phosphate, garlic, pepper, dry seasoning ingredients, gum) and mix 5 minutes
3. Add emulsifier and mix 5 minutes
4. Heat to 175° F. and hold 5 minutes Fat Phase
1. Mix cream with liquid cheese flavors and butter heating to 130° F.
2. Combine fresh cheese, with remaining dry flavors
3. Heat to 180° F. and hold 5 minutes until cheese is melted
4. Homogenize slurry at 2700 psi (2200–2500 psi first stage, 400–500 psi second stage)
5. Mix water phase with fat phase and heat to 175° F. for 5 minutes
6. Homogenize combined phases at 500 psi
7. Heat in a heat exchanger (No-Bac HEX) to 292° F. for 3.5 seconds an Fo of 6 (or conditions sufficient to achieve commercial sterility)
8. Cool to 90–100° F.
9. Fill aseptically This product will have pH of 6.2–6.3 that makes this sauce complement acidified pasta to provide a familiar, please flavor.

This formulation can also be prepared using a retort process. In that case step 7 under "Fat Phase" would be changed to:
7. Fill containers (in this case retortable pouches) with product, place in a retort (Stock Pilot Rotor 900) and thermally process to achieve a temperature of 250° F. for 10 minutes to achieve an Fo of 6 (or conditions sufficient to achieve commercial sterility)
8. Cool to 90–100° F.

EXAMPLE 3

Cheese sauce that is successfully marketed for use with freshly cooked conventional pasta normally has a pH of 5.4 to 5.6. Pasta used is typically dry pasta that has been cooked in boiling water for 10 minutes or until a desirable texture is achieved. The resulting pasta is close to a pH of 6.8 to 7.0. Freshly extruded pasta or pasta that has been not fully dried can also be used. When fully cooked and hydrated, these pastas will also have a pH close to 6.8 to 7.0. When used with commercial sauces, the combination has a pleasant flavor that can be characterized as Cheese, Cheddar Cheese or a flavored variety. Examples of such sauces are Kraft Macaroni and Cheese, Kraft Velveeta Shells and Cheese. Sauces are typically made from a dry blend of cheese and cheese flavors or a shelf stable cheese sauce that is formulated to be stable to microbial growth by controlling the amount of water, the pH and amount of phosphates, work based on that of Tanaka *Journal of Food Protection*, Vol. 49, No. 7, pages 526–531 (July 1986), the entire disclosure of which is herein incorporated by reference. Typically, these sauces are in the pH range of 5.3 to 5.5. Similar sauces could be made as refrigerated or frozen sauces. When these sauces are combined with an acidified pasta such as that made under U.S. Pat. No. 5,795,607, the combination of sauces and acidified pasta have an unpleasant acidic aftertaste, uncharacteristic of that made with conventional pasta. In this invention, a sauce is made with an uncharacteristically higher pH to provide a balanced flavor similar to that of the combination of conventional pasta and conventional sauce. By elevating the pH to 5.7 to 6.0, a more desirable flavor is achieved when the sauce is combined with acidified pasta.

EXAMPLE 3

An alternative approach to the sauces with adjusted pH in "Example 3" is a cheese sauce that is produced aseptically. An example of this cheese sauce was made with the following methodology:

| | |
|---|---|
| Cheddar Cheese | 19.01% (10.0–30.0%) |
| Processed Cheese | 6.86% (0.0–10.0%) |
| Cheese Powder | 4.62% (2.0–20.0%) |
| Butter Powder | 2.77% (0.0–5.0%) |
| Soy Lecithin | 0.046% (2.5–3.5%) |
| Partially Hydrogenated Soybean Oil | 1.85% (0–5%) |
| Disodium Phosphate Duohydrate | 1.54% (Quantity to adjust pH to desired level approximately 0.7%–1.0%) |
| Starch | 1.99% (Quantity to adjust viscosity to desired level approximately 2.0–2.5%) |
| Sodium Alginate | 0.46% |
| Flavors | 3.7% (sugar, cheese flavor, salt) |
| Water | 57.154% |

1. Dry blend starch, alginate and phosphate
2. Add water to Waring blender
3. Using high speed, add the dry blend and mix for 2 minutes
4. Add Cheeses, Cheese powder, butter powder
5. Add oil and lecithin, blend until well mixed
6. Heat to 120° F.
7. Add buffer solution to achieve desired pH of 6.3 (buffer solution 142 grams of Disodium Phosphate per 1000 grams of water)
8. Process slurry on aseptic system running at 25 gallons/minute ($1^{st}$ heater to 140° F., $2^{nd}$ heater to 180° F., holding at time 292° F.)
9. Cool to 130° F.
10. Package material and refrigerate or fill aseptically In a particularly preferred embodiment, acidified pasta or rice is prepared as described in U.S. Pat. No. 5,759,607, the entire disclosure of which is herein incorporated by reference. Such acidified pasta or rice is hermetically sealed, preferably under an inert gas, in a container such as a pouch or serving tray. The hermetically packaged sauce is included in the container or, alternatively, sold in combination with, the acidified pasta or rice, such that the combination of the modified sauce and acidified pasta/rice will result in a more pleasant flavor profile when the sauce is mixed with the pasta/rice.

The combination of pasta or rice and sauce according to the invention can easily be produced and is very convenient for consumers. No additional step of adding or mixing a neutralizing agent to the acidified pasta is needed and, thus, the food preparation is simpler and more typical of a preparation with which the consumer is familiar. The acidified product mixed with the pH adjusted sauce has a more typical, pleasant flavor profile that was much preferred by tasters. Acidic flavor notes that were detected with the regular sauce were not present with the pH adjusted sauce.

Typical sauces which are usable in the invention include:
Brown Sauce
Bordelaise
Mushroom Brown Sauce
White Sauce
Alfredo Sauce
Curry Sauce
Dill Sauce
Horseradish Sauce
Veloute Sauce
Hollandaise Sauce
Bearnaise Sauce
Mornay Sauce
Raisin Sauce
Cream Gravy
Giblet Gravy
Tomato Sauce The pH range of these sauces is typically about 4.5 to about 7.0 in their natural state, but the pH can be raised as in the Examples above in order to neutralize the flavor of the acidified pasta or rice.

Having fully described our invention, it will be clear to those skilled in the art that they may modify the invention without departing from the spirit or scope of the invention.

What we claim:

1. A shelf stable pasta or rice meal comprising in combination:
   (a) a cooked pasta or rice which has been acidified to a pH in the range of about 3.7 to about 4.5;
   (b) a pH modified sauce for use with said cooked pasta or rice, the sauce comprising an added edible alkaline or base substance, such that said sauce has a pH in a range of about 5.9 to about 7.2,
   wherein the edible alkaline substance is selected from the group consisting of disodium phosphate, disodium phosphate duohydrate and sodium hydroxide;
   wherein said sauce is one selected from the group consisting of cheese sauce, brown sauce, bordelaise sauce, mushroom brown sauce, white sauce, alfredo sauce, curry sauce, dill sauce, horseradish sauce, veloute sauce, hollandaise sauce, bearnaise sauce, mornay sauce, raisin sauce, cream gravy, giblet gravy and tomato sauce.

2. A shelf stable pasta or rice meal comprising in combination:
   (a) a cooked pasta or rice which has been acidified to a pH in the range of about 3.7 to about 4.5;
   (b) a pH modified sauce for use with said cooked pasta or rice, the sauce comprising an added edible alkaline or base substance, such that said sauce has a pH in a range of about 5.9 to about 7.2,
   wherein the edible alkaline substance is selected from the group consisting of disodium phosphate, disodium phosphate duohydrate and sodium hydroxide.

3. A shelf stable pasta or rice meal comprising in combination:
   (a) a cooked pasta or rice which has been acidified to a pH in the range of about 3.7 to about 4.5;
   (b) a pH modified sauce for use with said cooked pasta or rice, the sauce comprising an added edible alkaline or base substance, such that said sauce has a pH in a range of about 5.9 to about 7.2,
   wherein the sauce comprises 0.7–1.0% of the edible alkaline substance.

4. The shelf stable pasta or rice meal of claim 3, wherein said sauce is one selected from the group consisting of cheese sauce, brown sauce, bordelaise sauce, mushroom brown sauce, white sauce, alfredo sauce, curry sauce, dill sauce, horseradish sauce, veloute sauce, hollandaise sauce, bearnaise sauce, mornay sauce, raisin sauce, cream gravy, giblet gravy and tomato sauce.

* * * * *